2 Sheets—Sheet 1.

W. R. BAKER,

Assignor to McCormick Harvesting Machine Company.

HARVESTER BINDER.

No. 10,106. Reissued May 9, 1882.

WITNESSES

Wm A. Skinkle

H. W. Elmore

INVENTOR

William R. Baker.

By his Attorneys

Parkinson & Parkinson

THE NORRIS PETERS CO., PHOTO-LITHO., WASHINGTON, D. C.

2 Sheets—Sheet 2.

W. R. BAKER,

Assignor to McCormick Harvesting Machine Company.

HARVESTER BINDER.

No. 10,106. Reissued May 9, 1882.

WITNESSES

Wm A. Skinkle

H. W. Elmore

INVENTOR

William R. Baker

By his Attorneys

Pancoast & Pancoast

THE NORRIS PETERS CO., PHOTO-LITHO., WASHINGTON, D. C.

UNITED STATES PATENT OFFICE.

WILLIAM R. BAKER, OF CHICAGO, ILLINOIS, ASSIGNOR TO THE McCORMICK HARVESTING MACHINE COMPANY, OF SAME PLACE.

HARVESTER-BINDER.

SPECIFICATION forming part of Reissued Letters Patent No. 10,106, dated May 9, 1882.

Original No. 242,177, dated May 31, 1881. Application for reissue filed April 13, 1882.

*To all whom it may concern:*

Be it known that I, WILLIAM R. BAKER, a citizen of the United States, and a resident of Chicago, in the county of Cook and State of Illinois, have invented certain new and useful Improvements in Harvester-Binders, of which the following is a specification.

The invention relates to that class of binders in which the gavel is automatically seized and bound, and more particularly to the type represented, for example, in Letters Patent of the United States to John F. Appleby, dated February 18, 1879, No. 212,420. In this special type packing arms or fingers are arranged usually below the chute-board and operate through slots therein to pack or compress the grain into a receptacle preparatory to binding. At the bottom of the receptacle the grain is received and partially supported upon pivoted fingers or bars, against which it is pressed by the packers in the formation of the bundle, and when sufficient grain is so compressed to form the bundle the force against the fingers causes them to rock or move backward a short distance. In making this backward movement the fingers are arranged to trip and set in motion the machinery which operates the binding-arm, and also, in some cases, to stop the packers while the bundle is being bound and discharged. Said fingers are carried upon or near the free end of a hinged bar or rod which swings or yields downward beneath the table or chute-board to withdraw the fingers from the path of the sheaf at the conclusion of the binding operation and permit it to be discharged.

My invention has reference to the mode of supporting this bar or rod to which the tripping-fingers opposing the packers are pivoted; and it consists in the provision of means whereby said bar is rigidly locked against downward play or yielding until the binding mechanism has been tripped by the action of the fingers, and in the special combinations hereinafter pointed out and claimed.

Figure 1:
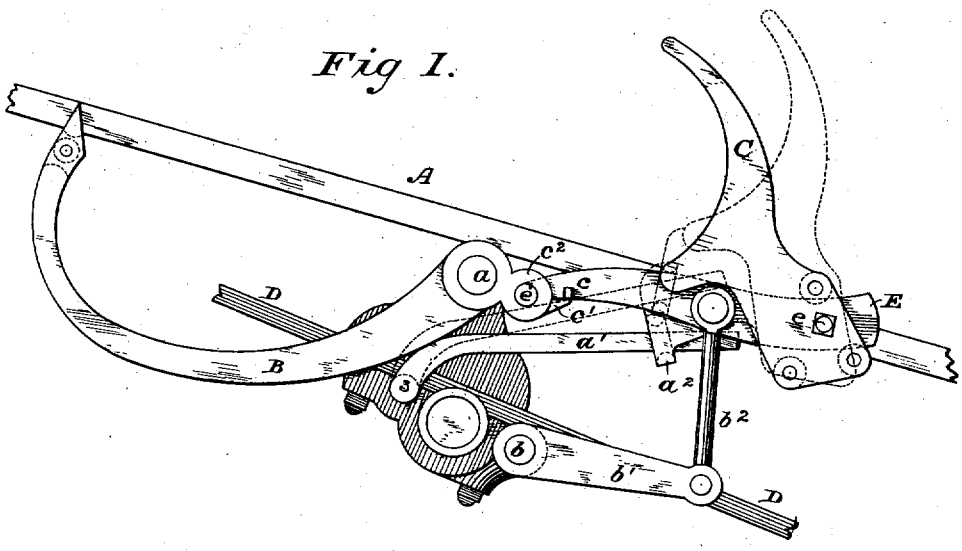
Figure 2:
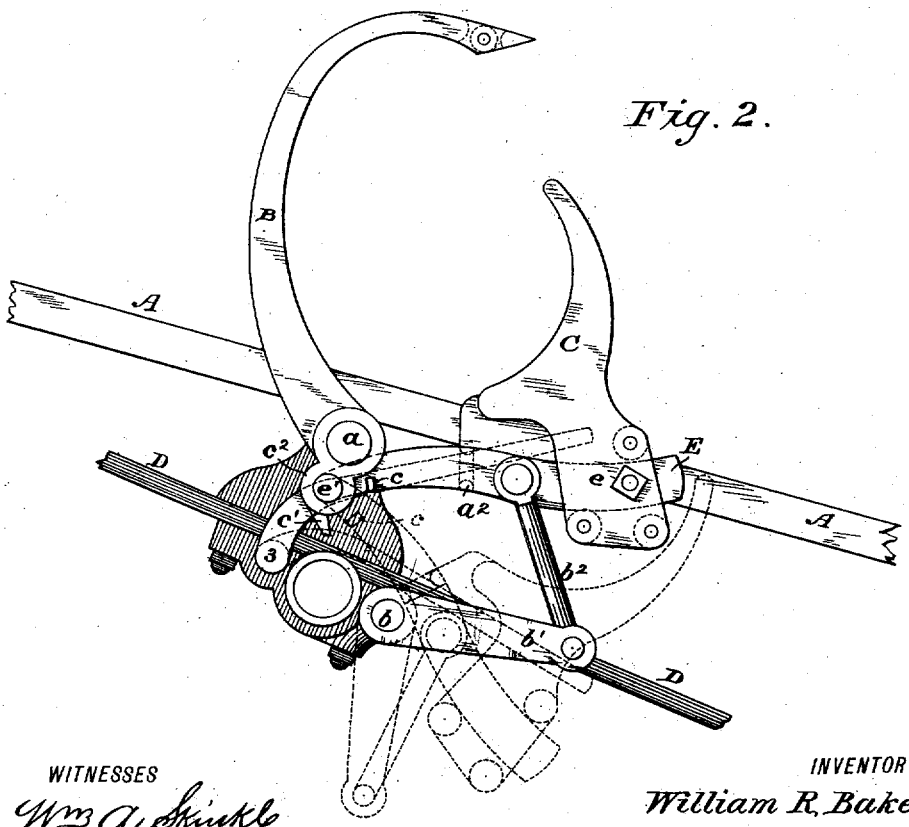
Figure 3:
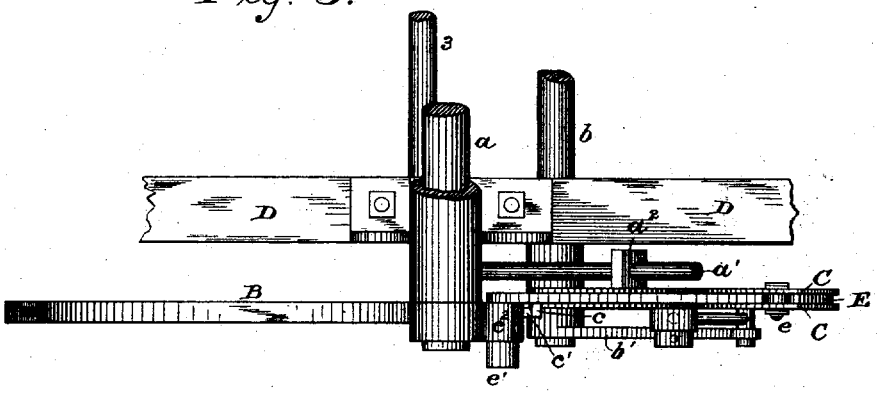
Figure 4:
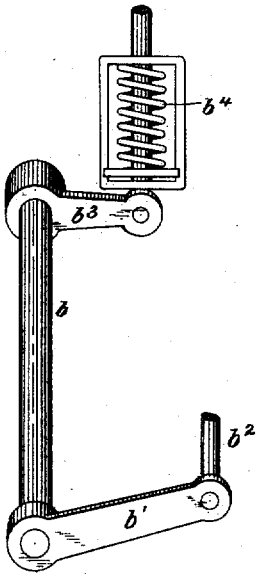

In the drawings, Figure 1 is a longitudinal section of the chute-board, through the slot in which the binding-arm operates, showing a side view of the binding-arm and one of the supporting-fingers in the position which these parts occupy when the packers are in operation. The dotted lines show the backward position of the fingers and the elevation of the trip-lever. Fig. 2 is a view on the same section as Fig. 1, with the parts shown in the operation of binding and discharging the bundle, the dotted lines showing the position of the fingers when the bundle is being discharged. Fig. 3 is a top or plan view of the parts shown in Figs. 1 and 2, without the chute-board, and having the operating shafts broken away. Fig. 4 is a view of one of the shafts detached.

Like letters of reference refer to like parts throughout the several views.

A designates the chute-board; B, the binding-arm; C, the tripping-fingers, which stand in the machine opposite to the packers, which are not shown.

D is a portion of the supporting-frame of the machine.

The chute-board is arranged upon the harvester at an incline of about twenty degrees (more or less) from a horizontal, with its elevated end next to the grain-elevator of the harvester, so that the grain as it falls will be caught thereon and will slide down toward the tripping-fingers and be stopped by them.

E designates the bar or rod to which the tripping-fingers are pivoted by a pivot, *e*. This bar is hinged to a heel-extension of the binding-arm by an eye, $c^2$, on said arm and a pin, $e'$, fixed on the bar and passing through the eye. The bar is supported in the position shown in Fig. 1 by a spring, $b^4$, acting through shaft *b* and cranks $b'$ $b^3$ and pitman-rod $b^2$ against the body of the arm.

The machinery is tripped by the grain pressing the finger C back to the position shown in dotted lines, Fig. 1. In doing this the finger rocks on pivot *e* and elevates the projecting lug $a^2$ on the bottom of the finger, which raises the tripping-lever $a'$, attached to shaft 3. The binding-arm is operated by a rock-shaft, *a*, set in motion, as is the remainder of the intermediate binding mechanism, by the tripping of the clutch through these instrumentalities.

All of the parts as thus illustrated and described are not materially different from those well known in the class of machines to which reference is made.

In all machines of this class the bar or rod

E, which carries the fingers which cause the tripping of the machine, is supported by a spring-support, similar to that shown in Fig. 4, and it not unfrequently happens, when the grain is damp or green, and from other causes, that the pressure of the grain against the bottom of the tripping-fingers will cause the spring-support to yield before the pressure at the top of the fingers is sufficient to cause their backward or rocking movement upon their pivot. The yielding of the spring in this manner allows that end of the bar E to which the fingers are pivoted to be borne down and lowered in its position, so that the backward movement of the fingers, taking place after such lowering, will not elevate the trip-lever, and hence the binding mechanism will not be started, nor where the packers are to be stopped will they be thrown out of action, and the machine will clog. To avoid this difficulty and remedy the defect I lock the supporting-bar positively against descent until the tripping movement of the fingers takes place, for this purpose making the hinge between the binding-arm or its rock-shaft and the finger-support E such as to support this bar in the position shown in Fig. 1, irrespective of the spring-support—that is, the hinge is made entirely rigid at this point, so that it will not allow the other end of the bar to drop any lower, whether it has or has not other support. This rigidity of the hinge at the point desired is best secured by means of a pin or lug, *c*, upon the bar E, and a lip or projection, *c'*, upon the eye $c^2$, arranged to meet at the point desired and prevent any further turning of the hinge. This affords a reliable support to said bar, and insures the tripping of the mechanism under all circumstances. As soon as the fingers have operated the trip, the binding-arm starts upon its upward movement, thus breaking the lock by carrying the lip *c'* away from the pin *c*, and the bar is free thereafter to be lowered at the proper moment to allow the discharge of the bound bundle. The return of the binding-arm to its first position renews the lock at the moment the clutch is thrown out, and the parts will be again ready for a fresh binding operation.

I claim as my invention—

1. In a grain-binder, the combination, with the grain-receptacle and supporting-bar which carries the tripping-fingers, of locking mechanism which holds said bar positively against movement away from the receptacle until the tripping-fingers have started the binding mechanism.

2. In a grain-binder, the combination, with the trip-lever, the yielding tripping-fingers, and the spring-supported bar which carries said fingers, of locking mechanism which positively stops the arm from yielding against the stress of the spring until the trip-lever has been actuated by the fingers.

3. In a grain-binder, the combination, with the vibrating binding-arm, the tripping finger or fingers, and the supporting-bar which carries the latter, of a hinge-connection between said binding-arm and supporting-bar rigid in one direction, whereby the bar is locked against yielding or sagging when the binding-arm is down.

4. In a grain-binder, the combination of the trip-lever, the tripping-fingers, the supporting-bar which carries the latter, the vibrating binding-arm, and a hinge-connection between said binding-arm and supporting-bar adapted to lock the latter against yielding away from the grain-receptacle until the trip-lever has been actuated and the binding mechanism started.

5. In a grain-binder, a support, E, for the compressing and tripping fingers C, hinged to the binding-arm, in combination with a pin, *c*, on support E, and a lip, *c'*, on the binding-arm, all arranged to operate substantially as and for the purpose specified.

WILLIAM R. BAKER.

Witnesses:
CYRUS H. MCCORMICK, Jr.,
E. K. BUTLER.